United States Patent
Larson et al.

(10) Patent No.: US 6,832,340 B2
(45) Date of Patent: Dec. 14, 2004

(54) REAL-TIME HARDWARE MEMORY SCRUBBING

(75) Inventors: John E. Larson, Houston, TX (US); John M. MacLaren, Cypress, TX (US); Robert A. Lester, Tomball, TX (US); Gary J. Piccirillo, Cypress, TX (US); Jerome J. Johnson, Spring, TX (US); Patrick L. Ferguson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 524 days.

(21) Appl. No.: 09/769,959

(22) Filed: Jan. 25, 2001

(65) Prior Publication Data

US 2001/0047497 A1 Nov. 29, 2001

Related U.S. Application Data

(60) Provisional application No. 60/178,212, filed on Jan. 26, 2000.

(51) Int. Cl.[7] ............................................. G06F 11/00
(52) U.S. Cl. ........................................ 714/42; 714/718
(58) Field of Search ....................... 714/42, 5, 6, 7, 714/54, 710, 718; 711/763–764, 143, 156

(56) References Cited

U.S. PATENT DOCUMENTS

| | | | |
|---|---|---|---|
| 5,267,242 A | * 11/1993 | Lavallee et al. | 714/7 |
| 5,313,626 A | 5/1994 | Jones et al. | 395/575 |
| 5,331,646 A | 7/1994 | Krueger et al. | 371/40.1 |
| 5,367,669 A | 11/1994 | Holland et al. | 395/575 |
| 5,495,491 A | * 2/1996 | Snowden et al. | 714/64 |
| 5,745,508 A | * 4/1998 | Prohofsky | 714/766 |
| 5,812,748 A | * 9/1998 | Ohran et al. | 714/4 |
| 5,978,952 A | * 11/1999 | Hayek et al. | 714/764 |
| 6,076,183 A | * 6/2000 | Espie et al. | 714/764 |
| 6,098,132 A | 8/2000 | Olarig et al. | 710/103 |
| 6,101,614 A | * 8/2000 | Gonzales et al. | 714/6 |
| 6,134,673 A | * 10/2000 | Chrabaszcz | 714/13 |
| 6,223,301 B1 | 4/2001 | Santeler et al. | 714/6 |
| 6,480,982 B1 | * 11/2002 | Chan et al. | 714/764 |
| 6,510,528 B1 | * 1/2003 | Freeman et al. | 714/6 |

* cited by examiner

Primary Examiner—Dieu-Minh Le

(57) ABSTRACT

A system and technique for correcting data errors in a memory device. More specifically, data errors in a memory device are corrected by scrubbing the corrupted memory device. Generally, a host controller delivers a READ command to a memory controller. The memory controller receives the request and retrieves the data from a memory sub-system. The data is delivered to the host controller. If an error is detected, a scrub command is induced through the memory controller to rewrite the corrected data through the memory sub-system. Once a scrub command is induced, an arbiter schedules the scrub in the queue. Because a significant amount of time can occur before initial read in the scrub write back to the memory, an additional controller may be used to compare all subsequent READ and WRITE commands to those scrubs scheduled in the queue. If a memory location is rewritten with new data prior to scheduled scrub corresponding to the same address location, the controller will cancel the scrub to that particular memory location.

40 Claims, 5 Drawing Sheets

FIG. 1
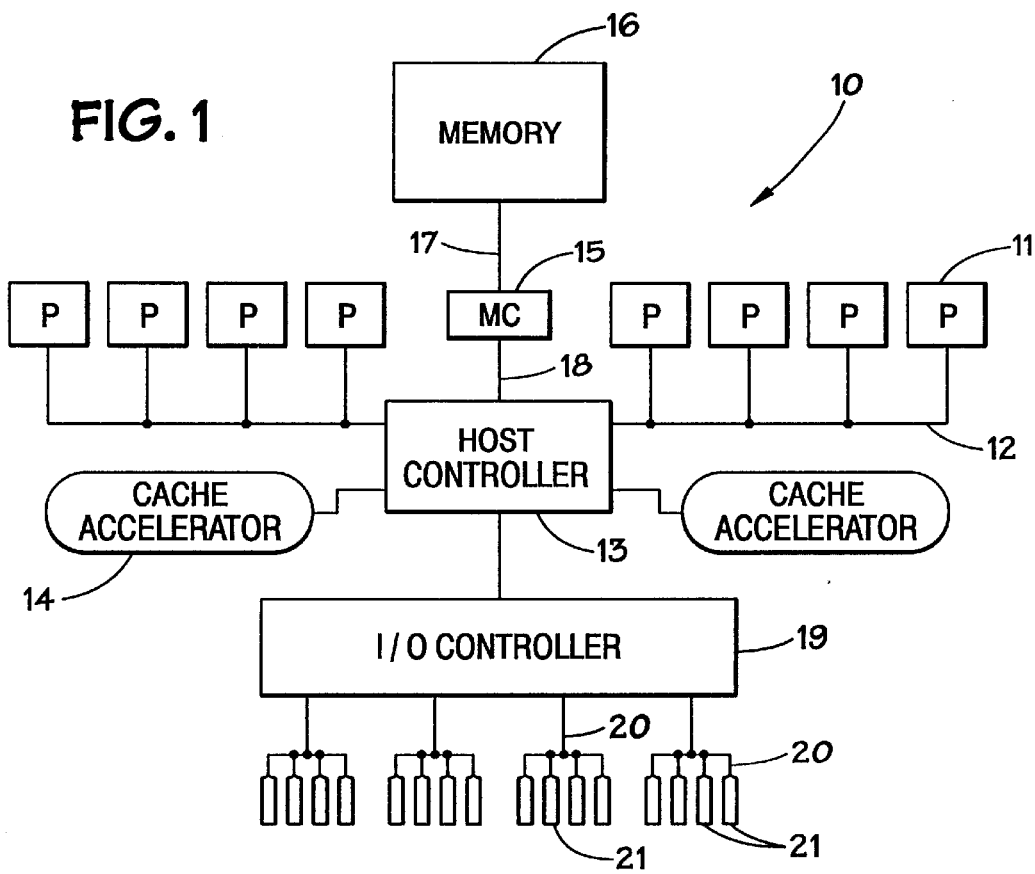
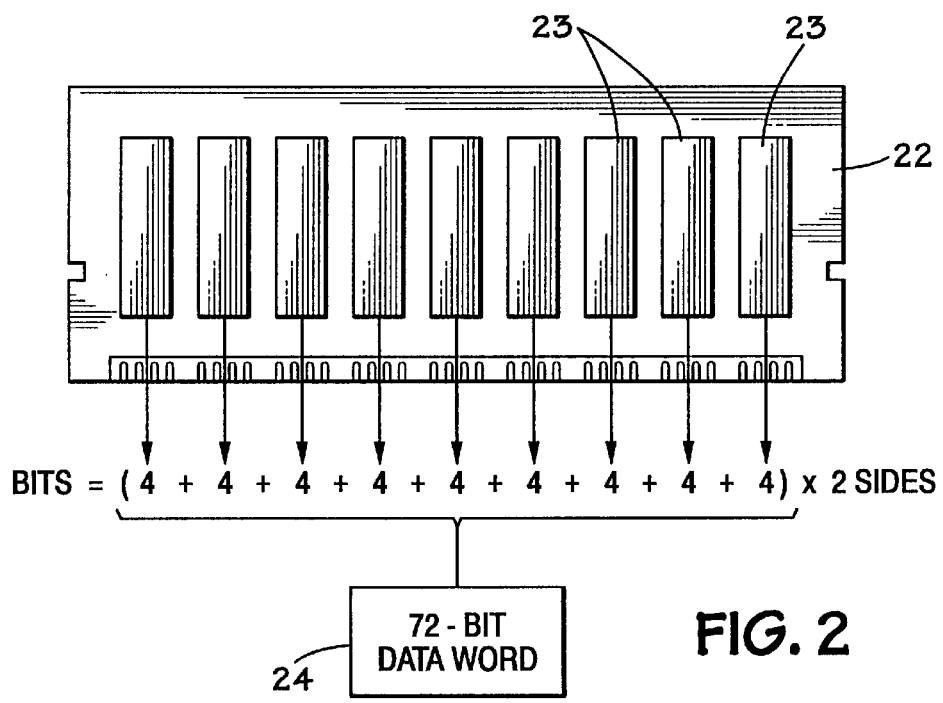
BITS = ( 4 + 4 + 4 + 4 + 4 + 4 + 4 + 4 + 4 ) x 2 SIDES
72 - BIT DATA WORD
FIG. 2

REAL-TIME HARDWARE MEMORY SCRUBBING

CROSS-REFERENCE TO RELATED APPLICATION

The present application claims priority under 35 U.S.C §119(e) to provisional application Ser. No. 60/178,212 filed on Jan. 26, 2000.

BACKGROUND OF THE INVENTION

1. Field of the Invention

The present invention relates generally to memory protection and, more specifically, to a technique for detecting and correcting errors in a memory device.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Semiconductor memory devices used in computer systems, such as dynamic random access memory (DRAM) devices, generally comprise a large number of capacitors which store the binary data in each memory device in the form of a charge. These capacitors are inherently susceptible to errors. As memory devices get smaller and smaller, the capacitors used to store the charges also become smaller thereby providing a greater potential for errors.

Memory errors are generally classified as "hard errors" or "soft errors." Hard errors are generally caused by poor solder joints, connector errors, and faulty capacitors in the memory device. Hard errors are reoccurring errors which generally require some type of hardware correction such as replacement of a connector or memory device. Soft errors, which cause the vast majority of errors in semiconductor memory, are transient events wherein extraneous charged particles cause a change in the charge stored in one or more of the capacitors in the memory device. When a charged particle, such as those present in cosmic rays, comes in contact with the memory circuit, the particle may change the charge of one or more memory cells, without actually damaging the device. Because these soft errors are transient events, generally caused by alpha particles or cosmic rays for example, the errors are not generally repeatable and are generally related to erroneous charge storage rather than hardware errors. For this reason, soft errors, if detected, may be corrected by rewriting the erroneous memory cell with the correct data. Uncorrected soft errors will generally result in unnecessary system failures. Further, soft errors may be mistaken for more serious system errors and may lead to the unnecessary replacement of a memory device. By identifying soft errors in a memory device, the number of memory devices which are actually physically error free and are replaced due to mistaken error detection can be mitigated, and the errors may be easily corrected before any system failures occur.

Soft errors can be categorized as either single-bit or multi-bit errors. A single bit error refers to an error in a single memory cell. Single-bit errors can be detected and corrected by standard ECC methods. However, in the case of multi-bit errors, (i.e., errors) which affect more than one bit, standard ECC methods may not be sufficient. In some instances, ECC methods may be able to detect multi-bit errors, but not correct them. In other instances, ECC methods may not even be sufficient to detect the error. Thus, multi-bit errors must be detected and corrected by a more complex means since a system failure will typically result if the multi-bit errors are not detected and corrected.

Even in the case of single-bit errors which may be detectable and correctable by standard ECC methods, there are drawbacks to the present system of detecting and correcting errors. One drawback of typical ECC methods is that multi-bit errors can only be detected but not corrected. Further, typical ECC error detection may slow system processing since the error is logged and an interrupt routine is generated. The interrupt routine typically stops all normal processes while the error is serviced. Also, harmless single-bit errors may align over time and result in an uncorrectable multi-bit error. Finally, typical scrubbing methods used to correct errors are generally implemented through software rather than hardware. Because the error detection is generally implemented through software, the correction of single-bit errors may not occur immediately thereby increasing the risk and opportunity for single-bit errors to align, causing an uncorrectable error or system failure.

The present invention may address one or more of the concerns set forth above.

BRIEF DESCRIPTION OF THE DRAWINGS

The foregoing and other advantages of the invention will become apparent upon reading the following detailed description and upon reference to the drawings in which:

FIG. 1 is a block diagram illustrating an exemplary computer system;

FIG. 2 illustrates an exemplary memory device used in the present system;

DETAILED DESCRIPTION OF SPECIFIC EMBODIMENTS

Figure 3:
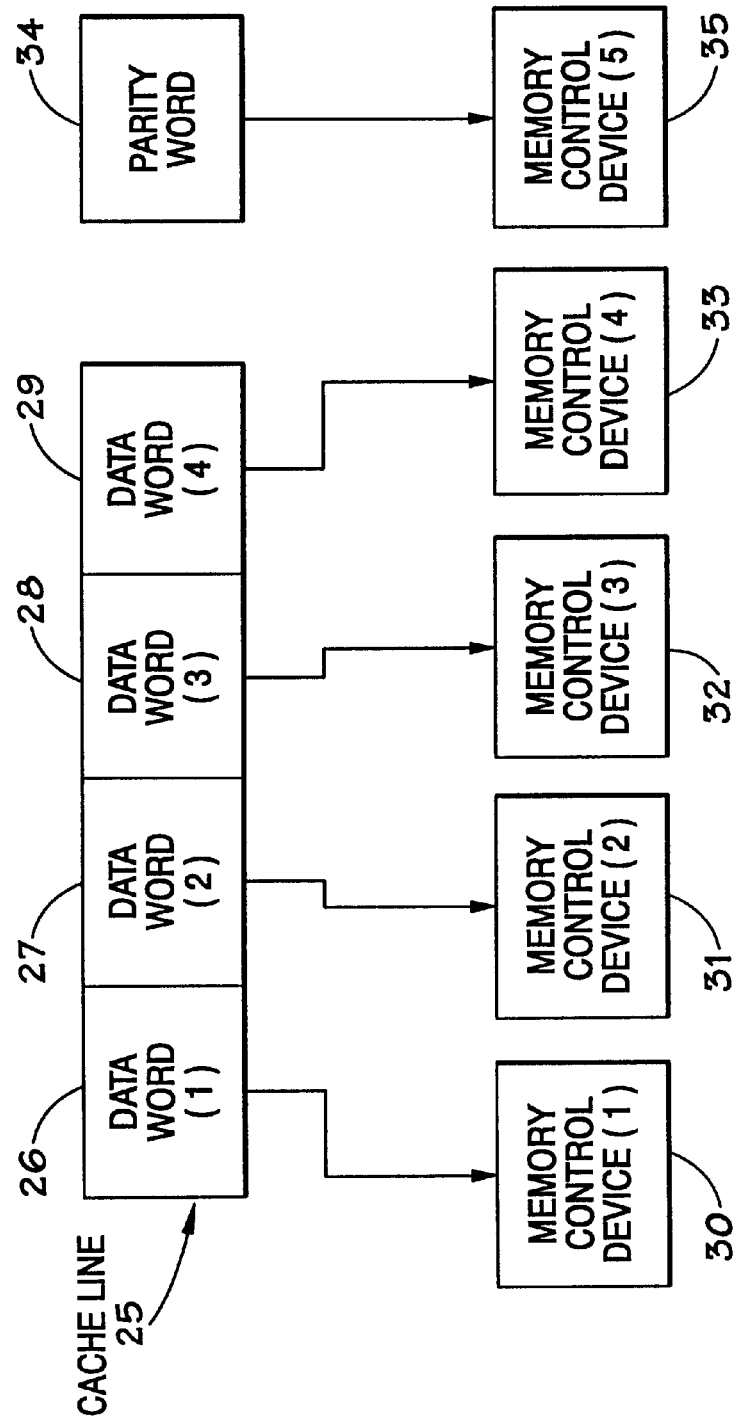
FIG. 3 generally illustrates a cache line and memory controller configuration in accordance with the present technique.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Turning now to the drawings, and referring initially to FIG. 1, a multiprocessor computer system, for example a Proliant 8500 PCI-X from Compaq Computer Corporation, is illustrated and designated by the reference numeral 10. In this embodiment of the system 10, multiple processors 11 control many of the functions of the system 10. The processors 11 may be, for example, Pentium, Pentium Pro, Pentium II Xeon (Slot-2), or Pentium III processors available from Intel Corporation. However, it should be understood that the number and type of processors are not critical to the technique described herein and are merely being provided by way of example.

Typically, the processors 11 are coupled to one or more processor buses 12. As instructions are sent and received by the processors 11, the processor buses 12 transmits the instructions and data between the individual processors 11 and a host controller 13. The host controller 13 serves as an interface directing signals between the processors 11, cache accelerators 14, a memory control block 15 (which may be comprised of one or more memory control devices as discussed with reference to FIGS. 5 and 6), and an I/O controller 19. Generally, one or more ASICs are located within the host controller 13. The host controller 13 may include address and data buffers, as well as arbitration and bus master control logic. The host controller 13 may also include miscellaneous logic, such as error detection and correction logic, usually referred to as ECC. Furthermore, the ASICs in the host controller may also contain logic specifying ordering rules, buffer allocation, specifying transaction type, and logic for receiving and delivering data.

When the data is retrieved from the memory 16, the instructions are sent from the memory control block 15 via a memory bus 17. The memory control block 15 may comprise one or more suitable types of standard memory control devices or ASICs, such as a Profusion memory controller.

The memory 16 in the system 10 is generally divided into groups of bytes called cache lines. Bytes in a cache line may comprise several variable values. Cache lines in the memory 16 are moved to a cache for use by the processors 11 when the processors 11 request data stored in that particular cache line.

The host controller 13 is coupled to the memory control block 15 via a memory network bus 18. As mentioned above, the host controller 13 directs data to and from the processors 11 through the processor bus 12, to and from the memory control block 15 through the network memory bus 18, and to and from the cache accelerator 14. In addition, data may be sent to and from the I/O controller 19 for use by other systems or external devices. The I/O controller 19 may comprise a plurality of PCI-bridges, for example, and may include counters and timers as conventionally present in personal computer systems, an interrupt controller for both the memory network and I/O buses, and power management logic. Further, the I/O controller 19 is coupled to multiple I/O buses 20. Finally, each I/O bus 20 terminates at a series of slots or I/O interface 21.

Generally, a transaction is initiated by a requester, e.g., a peripheral device, via the I/O interface 21. The transaction is then sent to one of the I/O buses 20 depending on the peripheral device utilized and the location of the I/O interface 21. The transaction is then directed towards the I/O controller 19. Logic devices within the I/O controller 19 generally allocate a buffer where data returned from the memory 16 may be stored. Once the buffer is allocated, the transaction request is directed towards the processor 11 and then to the memory 16. Once the requested data is returned from the memory 16, the data is stored within a buffer in the I/O controller 19. The logic devices within the I/O controller 19 operate to read and deliver the data to the requesting peripheral device such as a tape drive, CD-ROM device or other storage device.

A system, such as a computer system, generally comprises a plurality of memory modules, such as Dual Inline Memory Modules (DIMMs). A standard DIMM may include a plurality of memory devices such as Dynamic Random Access Memory devices (DRAMs). In an exemplary configuration, a DIMM may comprise nine semiconductor memory devices on each side of the DIMM. FIG. 2 illustrates one side of a DIMM 22 which includes nine DRAMs 23. The second side of the DIMM 22 may be identical to the first side and may comprise nine additional DRAM devices (not shown). Each DIMM 22 generally accesses all DRAMs 23 on the DIMM 22 to produce a data word. For example, a DIMM comprising x4 DRAMs (DRAMs passing 4-bits with each access) will produce 72-bit data words. System memory is generally accessed by CPUs and I/O devices as a cache line of data. A cache line generally comprises several 72-bit data words. Thus, in this example, each DIMM 22 accessed on a single memory bus provides a 72-bit data word 24.

Each of the 72 bits in each of the data words 14 is susceptible to soft errors. Different methods of error detection may be used for different memory architectures. The present method and architecture incorporates a Redundant Array of Industry Standard DIMMs (RAID). As used herein in this example, RAID memory refers to a "4+1 scheme" in which a parity word is created using an XOR module such that any one of the four data words can be re-created using the parity word if an error is detected in one of the data words. Similarly, if an error is detected in the parity word, the parity word can be re-created using the four data words. By using the present RAID memory architecture, not only can multi-bit errors be easily detected and corrected, but it also provides a system in which the memory module alone or the memory module and associated memory controller can be removed and/or replaced while the system is running (i.e. the memory modules and controllers are hot-pluggable).

FIG. 3 illustrates how RAID memory works. RAID memory "stripes" a cache line of data 25 such that each of the four 72-bit data words 26, 27, 28, and 29 is transmitted through a separate memory control device 30, 31, 32, and 33. A fifth parity data word 34 is generated from the original data line. Each parity word 34 is also transmitted through a separate memory control device 35. The generation of the parity data word 34 from the original cache line 25 of data words 26, 27, 28, and 29 can be illustrated by way of example. For simplicity, four-bit data words are illustrated. However, it should be understood that these principals are applicable to 72-bit data words, as in the present system, or any other useful word lengths. Consider the following four data words:

| |
|---|
| DATA WORD 1: 1011 |
| DATA WORD 2: 0010 |
| DATA WORD 3: 1001 |
| DATA WORD 4: 0111 |

A parity word can be either even or odd. To create an even parity word, common bits are simply added together. If the sum of the common bits is odd, a "1" is placed in the common bit location of the parity word. Conversely, if the sum of the bits is even, a zero is placed in the common bit location of the parity word. In the present example, the bits may be summed as follows:

| |
|---|
| DATA WORD 1: 1011 |
| DATA WORD 2: 0010 |
| DATA WORD 3: 1001 |
| DATA WORD 4: 0111 |
| 2133 |
| PARITY WORD: 0111 |

When summed with the four exemplary data words, the parity word 0111 will provide an even number of active bits (or "1's") in every common bit. This parity word can be used to re-create any of the data words (1–4) if a soft error is detected in one of the data words as further explained with reference to FIG. 3.

Figure 4:
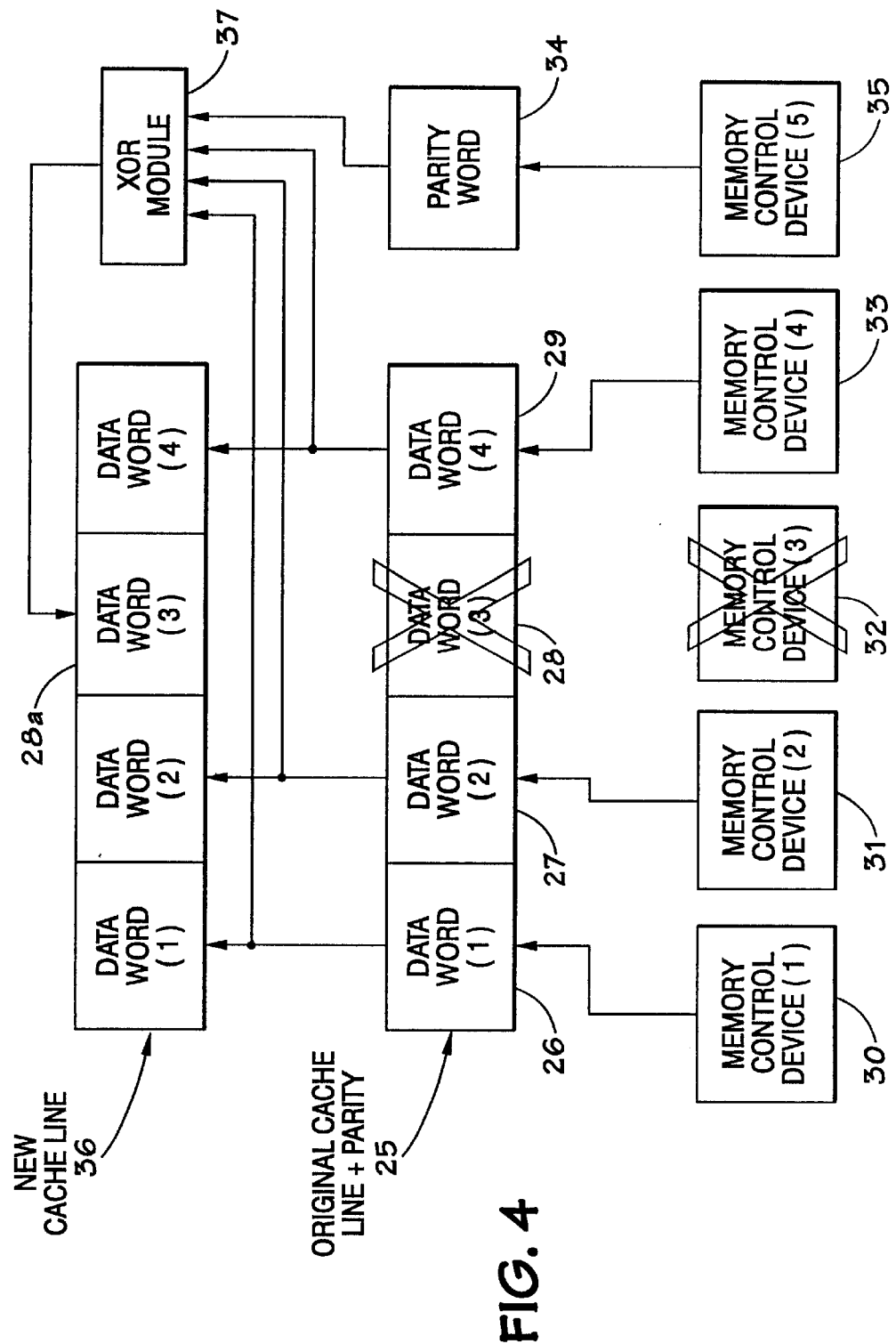
FIG. 4 generally illustrates the implementation of a RAID memory system.

FIG. 4 illustrates the re-creation of a data word in which a soft error has been detected in a RAID memory system. As in FIG. 3, the original cache line 25 comprises four data words 26, 27, 28, and 29 and a parity word 34. Further, the memory control devices 30, 31, 32, 33, and 35 corresponding to each data word and parity word are illustrated. In this example, a data error has been detected in the data word 28. A new cache line 36 can be created using data words 26, 27, and 29 along with the parity word 34 using an exclusive-OR (XOR) module 37. By combining each data word 26, 27, 29 and the parity word 34 in the XOR module 37, the data word 28 can be re-created. The new and correct cache line 36 thus comprises data words 26, 27, and 29 copied directly from the original cache line 25 and data word 28a (which is the re-created data word 28 ) which is produced by the XOR module 37 using the error-free data words ( 26, 27, 29) and the parity word 34. It should also be clear that the same process may be used to re-create a parity word 34 if an error is detected therein.

Similarly, if the memory controller 32, which is associated with the data word 28, is removed during operation (i.e. hot-plugging) the data word 28 can similarly be re-created. Thus, any single memory controller can be removed while the system is running or any single memory controller can return a bad data word and the data can be re-created from the other four memory control devices using an XOR module.

Figure 5:
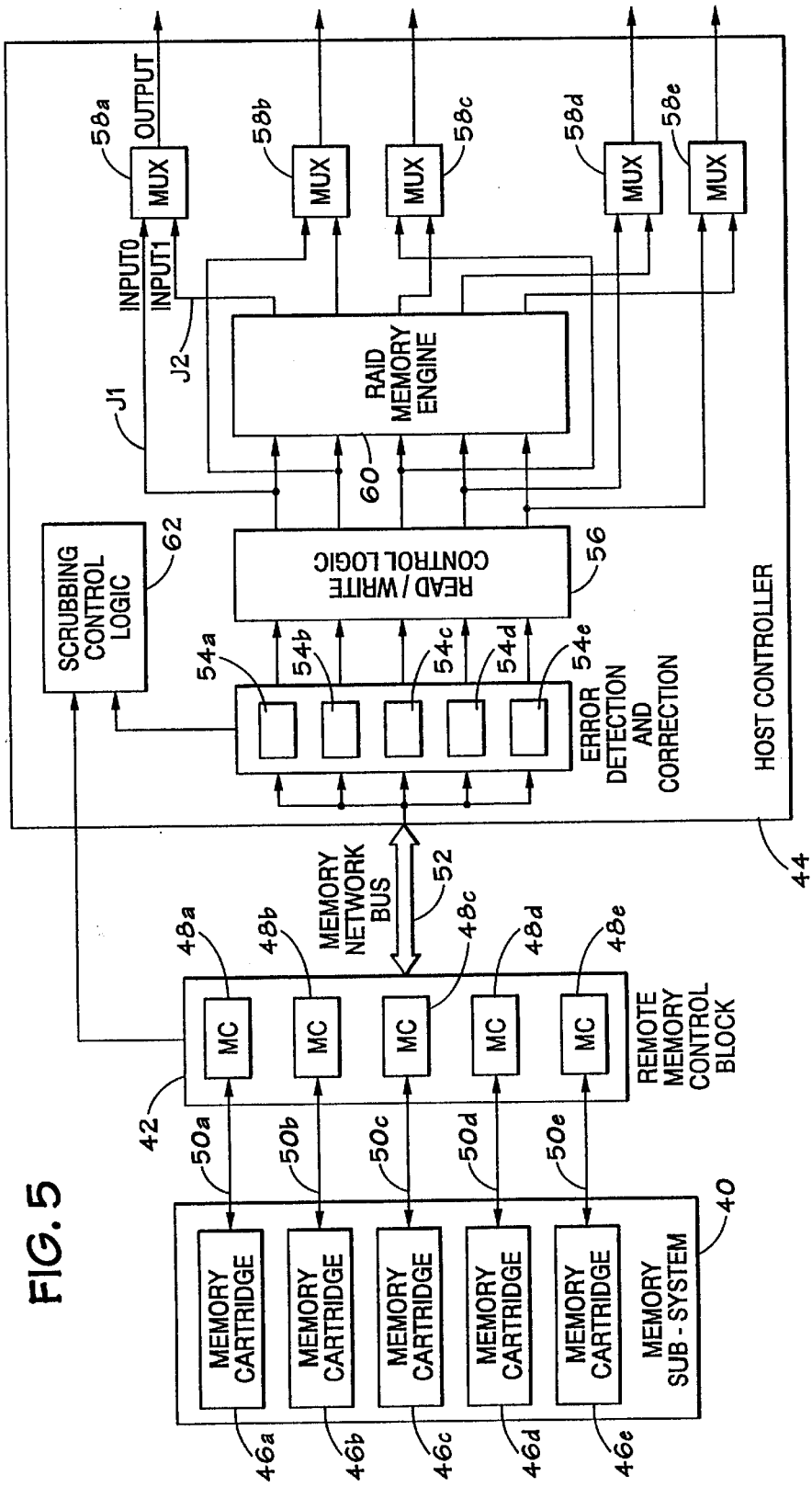
FIG. 5 is a block diagram illustrating the architecture associated with a memory read in accordance with the present technique.
Figure 6:
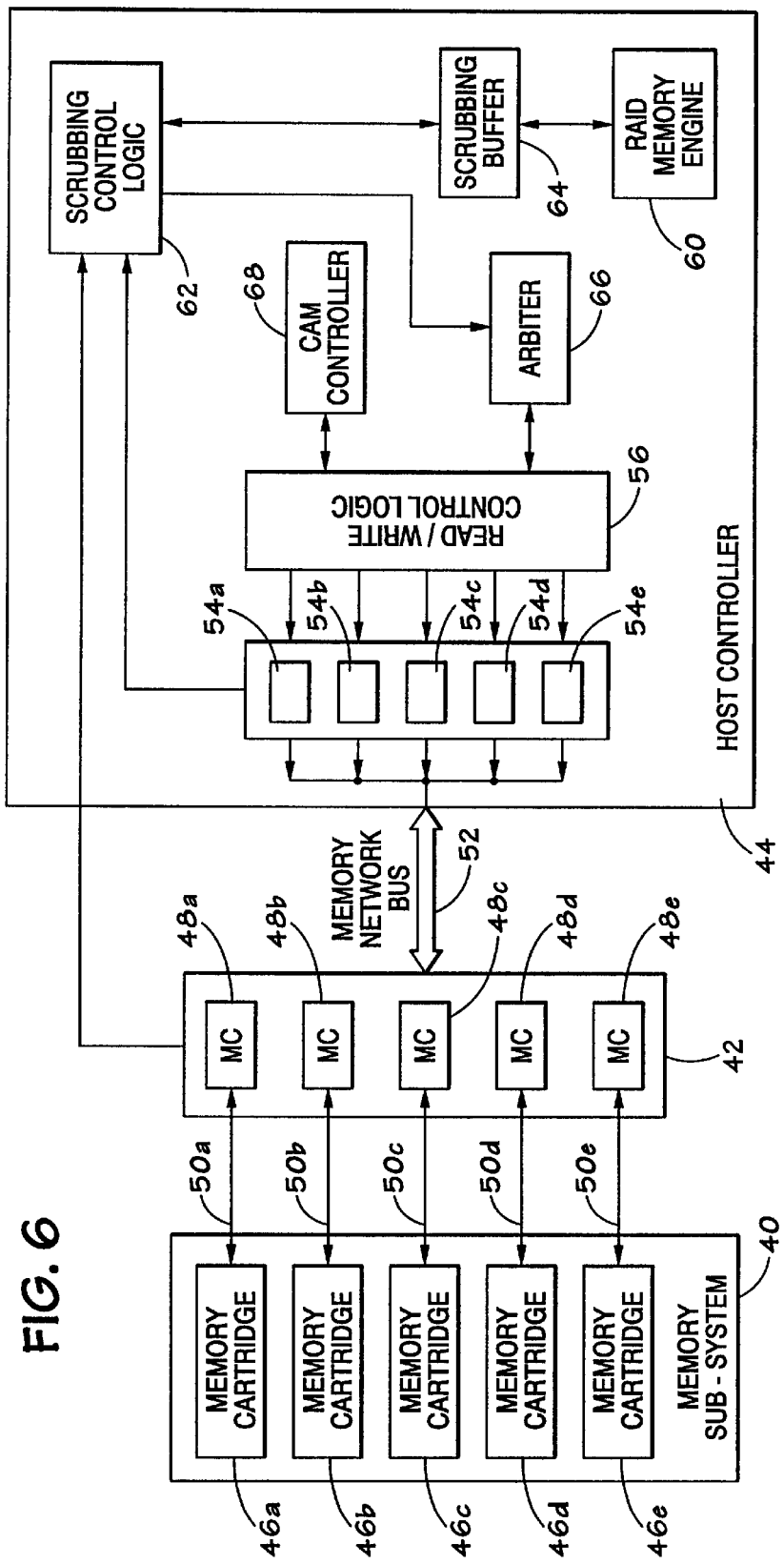
FIG. 6 is a block diagram illustrating the architecture associated with a memory write in accordance with the present technique.

FIGS. 5 and 6 illustrate one embodiment of the present technique that incorporates RAID memory into the present system. FIG. 5 is a block diagram illustrating a memory READ function in which errors are detected and corrected while being delivered to an external source. FIG. 6 is a block diagram illustrating the memory WRITE function in which corrupted memory data is over-written with corrected data which was re-created using the XOR module, as discussed with reference to FIG. 4. It should be understood that the block diagrams illustrated in FIGS. 5 and 6 are separated to provide the logical flow of each operation (reading from memory and scrubbing the memory by writing). While the operations have been logically separated for simplicity, it should be understood that the elements described in each Fig. may reside in the same device, here the host controller.

Referring initially to FIG. 5, a computer architecture comprising a memory sub-system 40, a memory controller 42, and a host controller 44 is shown. The memory sub-system 40 may comprise memory cartridges 46a, 46b, 46c, 46d, and 46e. Each memory cartridge 46a–e may comprise a plurality of memory modules such as DIMMs. Each DIMM comprises a plurality of memory devices, such as DRAMs or Synchronous DRAMs (SDRAMs). In the exemplary embodiment, the memory cartridge 46e is used for parity storage. However, it should be understood that any of the memory cartridges 46a–e may be used for parity storage. The memory controller 42 comprises a number of memory control devices 48a–e corresponding to each of the memory cartridges 46a–e. The memory control devices 48a–e may comprise five individual devices, as in the present embodiment. However, it should be understood that the five controllers 48a–e may reside on the same device. Further, each memory controller 48a–e may reside on a respective memory cartridge 46a–e. Each of the memory control devices 48a–e is associated with a respective memory cartridge 46a–e. Thus, memory cartridge 46a is accessed by memory controller 48a, and so forth. Each memory cartridge 46a–e is operably coupled to a respective memory controller 48a–e via memory buses 50a–e.

Each memory controller 48a–e may comprise ECC fault tolerance capability. As data is passed from the memory sub-system 40 to the memory controller 42 via data buses 50a–e, each data word is checked for single-bit errors in each respective memory controller 48a–e by typical ECC methods. If no errors are detected, the data is simply passed to the host controller and eventually to an output device. However, if a single-bit error is detected by a memory controller 48a–e, the data is corrected by the memory controller 48a–e. When the corrected data is sent to the host controller 44 via a memory network bus 52, the error detection and correction devices 54a–e which reside in the host controller 44 and may be identical to the ECC devices in the memory control devices 48a–e, will not detect any erroneous data words since the single-bit error has been corrected by the memory control devices 48a–e in the memory controller 42. However, the single-bit error may still exist in the memory sub-system 40. Therefore, if an error is detected and corrected by the memory controller 48a–e, a message is sent from the memory controller 48a–e to the host controller 44 indicating that a memory cartridge 46a–e should be scrubbed, as discussed in more detail below.

In an alternate embodiment, the error detection capabilities in the memory control devices 48a–e may be turned off or eliminated. Because the host controller 44 also includes error detection and correction devices 54a–e, any single bit errors will still be corrected using standard ECC methods. Further, it is possible that errors may be injected while the data is on the memory network bus 52. In this instance, even if the error detection capabilities are turned on in the memory controller 42, the memory control devices 48a–e will not detect an error since the error occurred after the data passed through the memory controller 48a–e. Advantageously, since the host controller 44 contains similar or even identical error detection and correction devices 54a–e, the errors can be detected and corrected in the host controller 44.

If a multi-bit error is detected in one of the controllers 48a–e, the memory controller 48a–e, with standard ECC capabilities, can detect the errors but will not be able to correct the data error. Therefore, the erroneous data is passed to the error detection and correction devices 54a–e. The error detection and correction devices 54a–e which also have typical ECC detection can detect the multi-bit errors and deliver the data to the RAID memory engine 60, via the READ/WRITE control logic 56, for correction. The error detection and correction device 54a–e will also send a message to the scrubbing control logic 62 indicating that the memory cartridge 46a–e in which the erroneous data word originated should be scrubbed.

After passing through the READ/WRITE control logic 56 each data word received from each memory controller 48a–e is transmitted to one or more multplexors (MUXs) 58a–e and to a RAID memory engine 60 which is responsible for the re-creation of erroneous data words as discussed with reference to FIG. 4. The data may be sent to INPUT 0 of a MUX 58a–e. FIG. 5 illustrates data J1 being delivered to INPUT 0 of the MUX 58a, for example. If the data word has not been flagged by the memory controller 42 as containing an error, the multiplexor 58a will pass the data word received from INPUT 0 to its OUTPUT for use by another controller or I/O device. Conversely, if the data word has been flagged with an error, the RAID memory engine 60 will re-create the erroneous data word using the remaining data words and the parity word, as described with reference to FIG. 4. The corrected data word J2 is delivered to INPUT 1 of the MUX 58a and will be passed through the multiplexor 58a to the OUTPUT and then to other controllers or I/O devices. Each MUX 58a–e is configured to transmit the data received on INPUT 0 if an error flag has not been set on the data word. If an error flag has been set, the MUX 58a–e will transmit the corrected data received on INPUT 1. Regardless, the OUTPUT signal from the MUX 58a–e will comprise a data word without soft errors.

In a typical memory READ operation, the host controller 44 will issue a READ on the memory network bus 52. The memory controller 42 receives the request and retrieves the data from the requested locations in the memory sub-system 40. The data is passed from the memory sub-system 40 and through the memory controller 42 which may correct and flag data words with single-bit errors and passes data words with multi-bit errors. The data is delivered over the memory network bus 52 to the error detection and correction devices 54a–e and the erroneous data (data containing uncorrected single-bit errors and any multi-bit errors) is corrected before it is delivered to another controller or I/O device. However, at this point, the data residing in the memory sub-system 40 may still be corrupted. To rectify this problem, the data in the memory sub-system 40 is overwritten or "scrubbed." For every data word in which a single-bit error is detected and flagged by the memory controller 42, a request is sent from the memory controller 42 to the scrubbing control logic 62 indicating that the corresponding memory location should be scrubbed during a subsequent WRITE operation. Similarly, if a multi-bit error is detected by the error detection and correction devices 54a–e, that data is corrected through the RAID memory engine 60 for delivery to a requesting device (not shown), such as a disk drive, and the scrubbing control logic 62 is notified by the error detection and correction device 54a–e that a memory location should be scrubbed.

FIG. 6 is a block diagram illustrating a memory WRITE in accordance with the present scrubbing technique. As previously illustrated, if a single-bit data error is detected in one of the memory control devices 48a–e, or a multi-bit error is detected in one of the error detection and correction devices 54a–e, a message is sent to the scrubbing control logic 62 indicating that an erroneous data word has been detected. At this time, the corrected data word and corresponding address location are sent from the RAID memory engine 60 to a buffer 64 which is associated with the scrubbing process. The buffer 64 is used to store the corrected data and corresponding address location temporarily until such a time that the scrubbing process can be implemented. Once the scrubbing control logic 62 receives an indicator (flag) that a corrupted data word has been detected and should be corrected in the memory sub-system 40, a request is sent to an arbiter 66 which schedules and facilitates all accesses in the memory sub-system 40. To ensure proper timing and data control, each time a data word is re-written back to the memory sub-system 40, an entire cache line may be re-written into the memory sub-system 40 rather than just rewriting the erroneous data word.

The arbiter 66 is generally responsible for prioritizing accesses to the memory sub-system 40. A queue comprises a plurality of requests such as memory READ, memory WRITE, and memory scrub, for example. The arbiter 66 prioritizes these requests and otherwise manages the queue. Advantageously, the present system allows the data correction to replace an erroneous data word without interrupting the system operation. The arbiter 66 selects the scrub cycle (re-writing of erroneous data words to the memory sub-system 40) when there is an opening in the queue rather than implementing the scrub immediately by initiating an interrupt. This action mitigates the impact on system performance. Hardware scrubbing generally incorporates a piece of logic, such as the scrubbing buffer 64, which is used to store corrected data and the corresponding address until such time that higher priority operations such as READ and WRITE requests are completed.

Further, the host controller 44 may comprise a content addressable memory (CAM) controller 68. The CAM controller 68 provides a means of insuring that memory re-writes are only performed when necessary. Because many READ and WRITE requests are active at any given time on the memory network bus 52 and because a scrubbing operation to correct corrupted data may be scheduled after the READ and WRITE, the CAM controller 68 will compare all outstanding READ and WRITE requests to subsequent memory scrub requests which are currently scheduled in the queue. It is possible that a corrupted memory location in the memory sub-system 40 which has a data scrub request waiting in the queue may be overwritten with new data prior to the scrubbing operation to correct the old data previously present in the memory sub-system 40. In this case, CAM controller 68 will recognize that new data has been written to the address location in the memory sub-system 40 and will cancel the scheduled scrubbing operation. The CAM controller 68 will ensure that the old corrected data does not overwrite new data which has been stored in the corresponding address location in the memory sub-system 40.

It should be noted that the error detection and scrubbing technique described herein may not distinguish between soft and hard errors. While corrected data may still be distributed through the output of the host controller, if the errors are hard errors, the scrubbing operation to correct the erroneous data words in the memory will be unsuccessful. To solve this problem, software in the host controller may track the number of data errors associated with a particular data word or memory location. After some pre-determined number of repeated errors are detected in the same data word or memory location, the host controller may send an error message to a user or illuminate an LED corresponding to the device in which the error is detected.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for correcting errors detected in a memory device, the system comprising:
   a memory sub-system comprising a plurality of memory cartridges configured to store data words;
   a memory controller operably coupled to the memory sub-system and configured to control access to the memory sub-system; and
   a host controller operably coupled to the memory controller and comprising:
      an arbiter configured to schedule accesses to the memory sub-system;
      error detection logic configured to detect errors in a data word which has been read from the memory sub-system;
      a memory engine configured to correct single-bit and multi-bit errors detected in the data word which has been read from the memory sub-system and configured to produce a corrected data word corresponding to the data word in which an error has been detected;
      scrubbing control logic configured to request a write-back to each memory location in which the error detection logic has detected an error in a data word which has been read from the memory sub-system; and
      one or more memory buffers configured to store the corrected data word.

2. The system for correcting errors detected in a memory device, as set forth in claim 1, wherein each of the plurality of memory cartridges comprises a plurality of memory modules.

3. The system for correcting errors detected in a memory device, as set forth in claim 2, wherein each of the plurality of memory modules comprises a Dual Inline Memory Module (DIMM).

4. The system for correcting errors detected in a memory device, as set forth in claim 2, wherein each of the plurality of memory modules comprises a plurality of memory devices.

5. The system for correcting errors detected in a memory device, as set forth in claim 4, wherein each of the plurality of memory devices comprises a Synchronous Dynamic Random Access Memory (SDRAM) device.

6. The system for correcting errors detected in a memory device, as set forth in claim 1, wherein the memory sub-system comprises five memory cartridges.

7. The system for correcting errors detected in a memory device, as set forth in claim 1, wherein the memory controller comprises a plurality of memory control devices, each memory control device corresponding to one of the plurality of memory cartridges.

8. The system for correcting errors detected in a memory device, as set forth in claim 7, wherein each of the memory control devices comprises error detection logic configured to detect errors in a data word which has been read from the memory sub-system.

9. The system for correcting errors detected in a memory device, as set forth in claim 7, wherein each of the plurality of memory cartridges comprises one of the plurality of memory control devices.

10. The system for correcting errors detected in a memory device, as set forth in claim 1, wherein the memory controller comprises error detection logic configured to detect errors in a data word during a READ operation.

11. The system for correcting errors detected in a memory device, as set forth in claim 1, wherein the memory engine comprises a Redundant Array of Industry Standard Dual Inline Memory Modules (RAID) memory engine configured to detect and correct failures in a memory device.

12. The system for correcting errors detected in a memory device, as set forth in claim 1, wherein the host controller comprises one or more logic devices configured to deliver a scrub request to the arbiter.

13. The system for correcting errors detected in a memory device, as set forth in claim 12, wherein the arbiter is configured to schedule a scrub of the address location corresponding to the data word in which an error is detected.

14. The system for correcting errors detected in a memory device, as set forth in claim 13, comprising a Content Addressable Memory (CAM) controller configured to compare outstanding READ and WRITE requests in the queue of the arbiter with outstanding scrub requests in the queue of the arbiter.

15. The system for correcting errors detected in a memory device, as set forth in claim 14, wherein the scrub request is cancelled if an address location of a scrub request contained in the queue is the same as the address location of one of the write requests scheduled prior to the scrub request in the queue.

16. The system for correcting errors detected in a memory device, as set forth in claim 1, wherein the memory engine comprises an exclusive-or (XOR) module.

17. A host controller comprising:
   an arbiter configured to schedule accesses to the memory sub-system;
   error detection logic configured to detect errors in a data word which has been read from the memory sub-system;
   a memory engine configured to correct single-bit and multi-bit errors detected in the data word which have been read from the memory sub-system and configured to produce a corrected data word corresponding to the data word in which an error has been detected;
   scrubbing control logic configured to request a write-back to each memory location in which the error detection logic has detected an error in a data word which has been read from the memory sub-system; and
   one or more memory buffers configured to store the corrected data word.

18. The system for correcting errors detected in a memory device, as set forth in claim 17, wherein the memory engine comprises a Redundant Array of Industry Standard Dynamic Integrated Memory Modules (RAID) memory engine configured to detect and correct failures in a memory device.

19. The system for correcting errors detected in a memory device, as set forth in claim 17, wherein the host controller comprises one or more logic devices configured to deliver a scrub request to the arbiter.

20. The system for correcting errors detected in a memory device, as set forth in claim 19, wherein the arbiter is configured to schedule a scrub of the address location corresponding to the data word in which an error is detected.

21. The system for correcting errors detected in a memory device, as set forth in claim 20, comprising a Content Addressable Memory (CAM) controller configured to compare outstanding READ and WRITE requests in the queue of the arbiter with outstanding scrub requests in the queue of the arbiter.

22. The system for correcting errors detected in a memory device, as set forth in claim 21, wherein the scrub request is cancelled if an address location of a scrub request contained in the queue is the same as the address location of one of the write requests scheduled prior to the scrub request in the queue.

23. The host controller, as set forth in claim 17, wherein the memory engine comprises an exclusive-or (XOR) module.

24. A method for correcting errors detected in a memory sub-system comprising the acts of:
   (a) issuing a READ command, the READ command comprising an address corresponding to a specific location in a memory sub-system;
   (b) receiving the READ command at the memory sub-system;
   (c) transmitting a first set of data, corresponding to the address issued in the READ command, from the memory sub-system to a memory controller and to a host controller;
   (d) detecting errors in the first set of data;
   (e) correcting single-bit and multi-bit errors detected in the first set of data;
   (f) producing a second set of data from the first set of data, wherein the second set of data comprises corrected data and corresponds to the address in the first set of data;
   (g) storing the second set of data and corresponding address in a temporary storage device;
   (h) scheduling a scrub of the address corresponding to the second set of data; and
   (i) writing the second set of data to the corresponding address location to replace the first set of data in the memory sub-system.

25. The method for correcting errors detected in a memory sub-system, as set forth in claim 24, wherein the memory sub-system comprises a plurality of memory cartridges.

26. The method for correcting errors detected in a memory sub-system, as set forth in claim 25, wherein each of the plurality of memory cartridges comprises a plurality of memory modules.

27. The method for correcting errors detected in a memory sub-system, as set forth in claim 26, wherein each of the plurality of memory modules comprises a plurality of memory devices configured to store data words.

28. The method for correcting errors detected in a memory sub-system, as set forth in claim 25, wherein the memory controller comprises a plurality of memory control devices, each of the plurality of memory control devices corresponding to one of the plurality of memory cartridges.

29. The method for correcting errors detected in a memory sub-system, as set forth in claim 28, wherein each of the plurality of memory cartridges comprises a corresponding memory control device.

30. The method for correcting errors detected in a memory sub-system, as set forth in claim 24, wherein act (d) comprises the act of using ECC methods to detect errors in the first cache line of data.

31. The method for correcting errors detected in a memory sub-system, as set forth in claim 24, wherein act (e) comprises the act of correcting the errors detected in the first cache line of data using a Redundant Array of Industry Standard Dual Inline Memory Modules (RAID) memory engine configured to detect and correct failures in a memory device.

32. The method for correcting errors detected in a memory sub-system, as set forth in claim 31, wherein the second cache line of data is produced by the RAID memory engine.

33. The method for correcting errors detected in a memory sub-system, as set forth in claim 24, wherein the temporary storage device is a buffer.

34. The method for correcting errors detected in a memory sub-system, as set forth in claim 24, wherein the scrub is scheduled in an arbitration queue residing in the host controller.

35. The method for correcting errors detected in a memory sub-system, as set forth in claim 34, comprising:
   comparing outstanding READ and WRITE requests in the arbitration queue with outstanding scrub requests in the arbitration queue; and
   canceling the scrub request if an address location corresponding with a scrub request contained in the queue is the same as the address location of one of the WRITE requests scheduled prior to the scrub request in the arbitration queue.

36. A system for correcting errors detected in a memory device, the system comprising:
   a memory sub-system comprising a plurality of memory cartridges configured to
   store data words;
   a memory controller operably coupled to the memory sub-system and configured to control access to the memory sub-system; and
   a host controller operably coupled to the memory controller and comprising:
      an arbiter configured to schedule accesses to the memory sub-system without initiating an interrupt;
      error detection logic configured to detect errors in a data word which has been read from the memory sub-system;
      a memory engine configured to correct the errors detected in the data word that has been read from the memory sub-system and configured to produce a corrected data word corresponding to the data word in which an error has been detected;
      scrubbing control logic configured to request a write-back to each memory location in which the error detection logic has detected an error in a data word which has been read from the memory sub-system; and
      one or more memory buffers configured to store the corrected data word.

37. A host controller comprising:
   an arbiter configured to schedule accesses to the memory sub-system without initiating an interrupt;
   error detection logic configured to detect errors in a data word which has been read from the memory sub-system;
   a memory engine configured to correct the errors detected in the data word that has been read from the memory sub-system and configured to produce a corrected data word corresponding to the data word in which an error has been detected;
   scrubbing control logic configured to request a write-back to each memory location in which the error detection logic has detected an error in a data word which has been read from the memory sub-system; and
   one or more memory buffers configured to store the corrected data word.

38. A method for correcting errors detected in a memory sub-system comprising the acts of:
   (a) issuing a READ command, the READ command comprising an address corresponding to a specific location in a memory sub-system;
   (b) receiving the READ command at the memory sub-system;
   (c) transmitting a first set of data, corresponding to the address issued in the READ command, from the memory sub-system to a memory controller and to a host controller;
   (d) detecting errors in the first set of data;
   (e) correcting the errors detected in the first set of data;
   (f) producing a second set of data from the first set of data, wherein the second set of data comprises corrected data and corresponds to the address in the first set of data;
   (g) storing the second set of data and corresponding address in a temporary storage device;
   (h) scheduling a scrub of the address corresponding to the second set of data; and
   (i) writing the second set of data to the corresponding address location to replace the first set of data in the memory sub-system without initiating an interrupt.

39. A system for correcting errors detected in a memory device, the system comprising:
   a memory sub-system comprising a plurality of memory cartridge configured to
   store data words;
   a memory controller operably coupled to the memory sub-system and configured to control access to the memory sub-system; and
   a host controller operably coupled to the memory controller and comprising:
      an arbiter configured to schedule accesses to the memory sub-system;
      error detection logic configured to detect errors in a data word which has been read from the memory sub-system;

a Redundant Array of Industry Standard Dual Inline Memory Modules (RAID) memory engine configured to correct the errors detected in the data word that has been read from the memory sub-system and configured to produce a corrected data word corresponding to the data word in which an error has been detected;

scrubbing control logic configured to request a write-back to each memory location in which the error detection logic has detected an error in a data word which has been read from the memory sub-system; and one or more memory buffers configured to store the corrected data word.

40. A host controller comprising:

an arbiter configured to schedule accesses to the memory sub-system;

error detection logic configured to detect errors in a data word which has been read from the memory sub-system;

a Redundant Array of Industry Standard Dual Inline Memory Modules (RAID) memory engine configured to correct the errors detected in the data word that has been read from the memory sub-system and configured to produce a corrected data word corresponding to the data word in which an error has been detected;

scrubbing control logic configured to request a write-back to each memory location in which the error detection logic has detected an error in a data word which has been read from the memory sub-system; and one or more memory buffers configured to store the corrected data word.

* * * * *